C. STICHLER.
GAS FIXTURE AND FUEL HOSE THEREFOR.
APPLICATION FILED MAY 7, 1918. RENEWED MAR. 1, 1920.
1,337,288.
Patented Apr. 20, 1920.
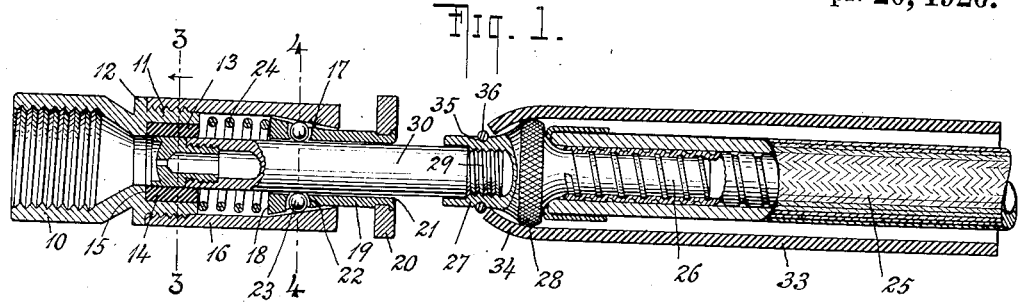
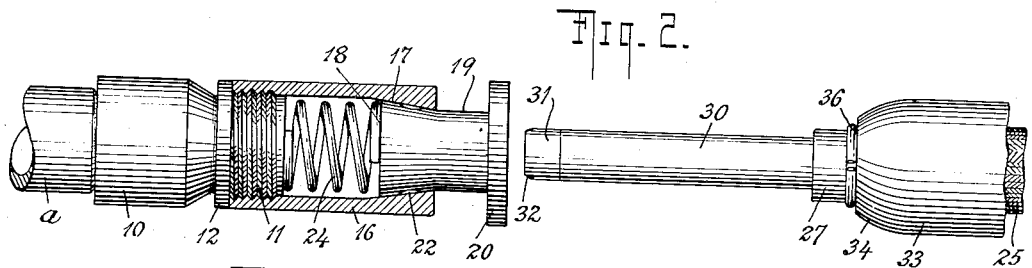
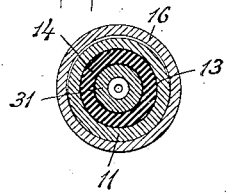
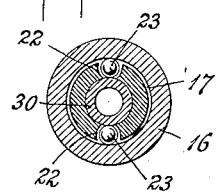
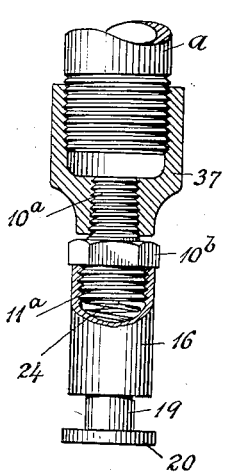
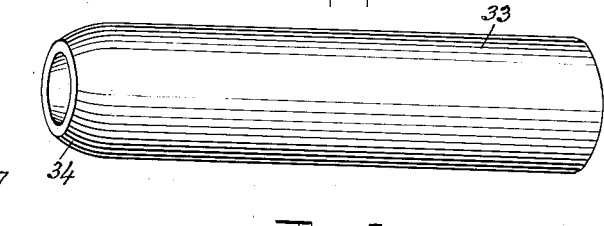
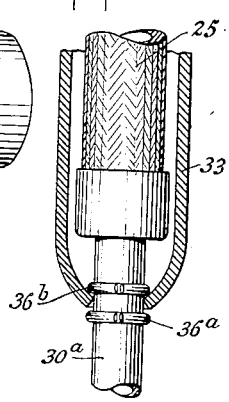
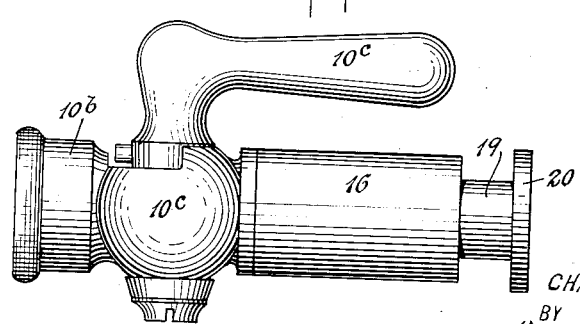
WITNESSES
INVENTOR
CHARLES STICHLER
BY
ATTORNEYS

UNITED STATES PATENT OFFICE.

CHARLES STICHLER, OF PHILADELPHIA, PENNSYLVANIA, ASSIGNOR TO STRAUSE GAS IRON CO., OF PHILADELPHIA, PENNSYLVANIA, A CORPORATION OF PENNSYLVANIA.

GAS-FIXTURE AND FUEL-HOSE THEREFOR.

1,337,288.  Specification of Letters Patent.  Patented Apr. 20, 1920.

Application filed May 7, 1918, Serial No. 233,012. Renewed March 1, 1920. Serial No. 362,549.

*To all whom it may concern:*

Be it known that I, CHARLES STICHLER, a citizen of the United States, and resident of Philadelphia, county of Philadelphia, State of Pennsylvania, have invented certain new and useful Improvements in Gas-Fixtures and Fuel-Hose Therefor, of which the following is a specification.

My invention relates to gas fixtures and to fuel conducting hose therefor and has for its object to provide a fixture and a hose including an improved coupling construction whereby the two are detachably connected together in an efficient and simple manner. A further object of my invention is to provide an improved and simple arrangement whereby the fuel hose may be comfortably handled and manipulated when being coupled with and uncoupled from the fixture and whereby the hose is efficiently protected against injury and leakage at a vulnerable point. My invention will be fully described hereinafter and the features of novelty will be pointed out in the appended claims.

In the accompanying drawings which, for illustrative and descriptive purposes, show examples of my invention, Figure 1 is a sectional view showing the parts of my invention in operative connection; Fig. 2 is an elevation partly in section with the parts disconnected or uncoupled; Fig. 3 is a cross section on the line 3—3 of Fig. 1; Fig. 4 is a similar view on the line 4—4 of Fig. 1; Fig. 5 is a perspective view of the protecting member forming part of my invention; and Figs. 6, 7 and 8 are detail views illustrating additional forms of my invention.

As shown in Fig. 1, the fixture comprises a tubular member or fitting 10 provided with a continuing neck 11 which in the preferred form is externally screw-threaded, said member being further preferably formed with an annular external flange 12 located at the inner end of said neck 11. The latter is recessed inwardly from its outer end as indicated at 13 to receive a packing 14 of rubber or other suitable material, the inner end of which abuts against an internal annular shoulder 15 formed at the inner end of the recess 13. In the preferred form the packing 14 is in the nature of a tube or the like and may be held in position in the recess 13 against axial outward displacement by friction alone, as shown in Fig. 1, or in any other suitable manner, as by means of suitable, positively acting, mechanical devices.

The neck 11 is arranged to detachably receive the inner end of a sleeve 16 which in the illustrated example is internally screw-threaded for connection with said neck; it will, of course, be understood that the connection between the neck 11 and sleeve 16 may be effected in other ways than by means of screw-threads and further that said elements are detachably connected for convenience of accessibility to the interior parts of my improvement. The inner surface of the sleeve 16 is inclined at least throughout a portion of its extent so as to converge toward its outer end as indicated at 17, a member 18 having its outer surface preferably, though not necessarily, corresponding in inclination to the inclination of the surface 17, being movable or slidable in an axial direction within and relatively to said sleeve 16. The member 18 is continued in the form of a reduced neck 19 which projects exteriorly of the sleeve 16 and at its outer end preferably carries an operating head or the like 20, to facilitate the manipulation of the device, as will appear more fully hereinafter. A passage 21 extends axially through the neck 19 and member 18, the latter being preferably provided with a plurality of apertures 22 in each of which a ball 23 is located; the apertures 22 are so shaped as to permit the balls 23 to be fully moved in outward radial directions against the inner surface 17 of the sleeve 16 but so as to prevent said balls from dropping entirely through in inward directions. In other words, the balls 23 are capable of projecting inwardly into the passage 21 but are held against dropping into the same as is clearly shown in the drawings. In the preferred arrangement a coil spring 24 is located within the sleeve 16 between the opposed and spaced ends of the neck 11 and member 18 exerts a pressure tending at all times to force said member 18 toward the converging portion 17 of the sleeve 16.

As shown in the illustrated example, the fuel conducting hose 25 which may be of any suitable or well known construction, has its one end secured upon a tubular extension 26 in any convenient manner, the extension 26, for instance, being externally roughened or screw-theaded, as shown, to resist a separation from said hose 25. The extension 26 in the form adopted for illustration, comprises an axial continuation of an internally screw-threaded member 27, an annular flange 28 being located between said extension 26 and member 27. The latter is arranged to receive the screw-threaded inner end 29 of a coupling tube 30 having an outer diameter adapted to fit into the passage 21 of the fixture and having, for instance, a detachable nozzle 31 at its outer end, said nozzle 31 being preferably beveled, as indicated at 32. Owing to the fact that in the form shown the coupling tube 30 is weakest at its screw-threaded portion 29 and because of its location on the fuel hose is exposed to blows and other shocks resulting from a careless manipulation of said hose, said coupling tube 30 when combined with the member 27, is liable to breakage at the junction of said screw-threaded end with the tube 30. In order to guard against this and to efficiently protect said tube 30 against injury at this point, the member 27 is continued outwardly beyond its internal screw-threads so that said member projects beyond the screw-threaded portion 29 of the tube 30 and over a portion thereof beyond the junction of said screw-threads 29 with the tube 30, as clearly shown in Fig. 1. With this arrangement, the projecting portion of the member 27 forms an annulus which efficiently protects the tube 30 at its weakest point or at the point where the screw-threads 29 begin, this point being located well within the member 27, as illustrated in the drawings. In other words, the projecting annulus of the member 27 rigidly braces the tube 30 against bending or distortion at said weak point from any cause.

When the fixture and fuel hose are connected, as shown in Fig. 1, the coupling tube 30 extends through the axial passage 21 of the member 18 and neck 19 and has its free end located within the packing 14, the beveled end 32 facilitating the insertion of said tube 30 into the fixture. The inner diameter of the packing 14 is such that it frictionally engages the tube 30 particularly at the beveled end 32 thereof, the packing in some cases being constructed so that it is compressed as the tube 30 is inserted; in other instances, the free end of said tube 30 may abut against the packing 14, the result in any event being an absolutely gas or other fuel-tight connection between the fixture and the fuel hose. When the tube 30 occupies its intended position in the fixture, the pressure of the spring 24 and the camming action of the converging surface 17 exerted on the ball or balls 23 will force the latter inwardly so as to project through the aperture or apertures 22 into firm and secure gripping engagement with the tube 30. An attempt to withdraw the latter from the passage 21 will cause said balls 23 to be carried outwardly in the direction of the axis of the sleeve 16 and to move along the surface 17 which, because of its convergence toward the free end of the sleeve 16, will exert a force tending to move said ball or balls still farther inwardly with the result that the gripping action thereof upon the tube 30 is increased, thus efficiently and effectively preventing the disconnection of the latter from the fixture.

When it is desired to intentionally disconnect the fuel hose from the fixture, the combined neck 19 and member 18 are moved inwardly against the tension of the spring 24 by a pressure exerted upon the operating head or the like 20. This causes the ball or balls 23 to be carried inwardly in the direction of the axis of said sleeve 16 and to be moved in the reverse direction along the surface 17 which diverges in this direction. The camming action of said surface 17 upon the ball or balls will thus be diminished and if the inward movement is continued far enough, will be entirely removed therefrom, so that the grip of the ball or balls upon the tube 30 will be released and, therefore, permit the latter to be easily withdrawn or disconnected from the fixture. It will be seen that the manipulation of the member 18 to disconnect the tube 30 is brought about by an inward pressure when the head 20 is exerted in a natural and comfortable manner by the person whereby the disconnection is being effected, and that all awkward, unnatural movements, such as, for instance, an outward movement of said head 20 away from the sleeve 16 to release the tube 30, are avoided.

When it is desired to connect the fuel hose with the fixture the tube 30 is inserted into the axial passage 21 under a pressure in an axial direction and its beveled end 32 forced into or against the packing 14. This operation causes the combined neck 19 and member 18 to be moved inwardly in the sleeve 16 and the opposing effect of the ball or balls 23 to be relieved until the tube 30 has reached its final position in said fixture. If the pressure in an axial direction is now removed, the spring 24 will immediately move the member 18 outwardly toward the free end of the sleeve 16 and thus cause the ball or balls 23 to firmly grip the tube 30 and secure it against unintentional withdrawal from the fixture.

It has been found in practice that the connection between the extension 26 or its equivalent, and the fuel hose 25, is liable to injury and to become broken during use, this being particularly true with respect to the outer covering of the hose which under the wear and tear of actual use, tends to break away from, for instance, the annular flange 28, it being understood that a suitable cement is generally used to maintain the hose 25 in operative connection with the extension 26 and the flange 28 thereof.

To overcome these disadvantages and objections and at the same time to provide a convenient medium whereby the coupling end of the fuel hose may be manipulated in connecting it with and disconnecting it from the fixture, the protecting sleeve 33 is provided. This sleeve 33 which may be constructed of any suitable material, although a heat insulating material is preferred, has its one end preferably reduced as indicated at 34 and is slipped over the coupling tube 30 and member 27 until said reduced end 34 engages the flange 28, as shown in Fig. 1. In this condition the sleeve 33 extends over said flange 28 and beyond the same over a portion of the hose 25 and over the joint between the latter and the extension 26 and flange 28. In other words, the latter and the connection between it and the fuel hose 25, as well as a continuing portion of the latter, are completely inclosed within said protecting sleeve 33 and covered thereby. The sleeve, in addition to serving as a handle or means whereby the fuel hose may be safely and comfortably manipulated, also prevents any bending or flexing of the fuel hose or any other injurious movement thereof relatively to the flange 28 and extension 26 tending to strain or break the connection particularly between the hose and said flange. It will be seen that the protecting sleeve, to be effective as a protecting medium, must extend in opposite directions between the joint represented in the present case by the connection between the fuel hose 25 and flange 28 so as to prevent any material flexing or other harmful relative movements at this point. A protecting sleeve inclosing an end portion of the fuel tube and terminating at one end at the flange 28 or, in other words, at the joint hereinbefore referred to, so that the flange or the joint is located at or beyond said end of the sleeve, will not answer the purpose. In fact, the suggested arrangement will aggravate the disadvantages rather than obviate the same as the end of the protecting sleeve in such case will not prevent a flexing of the fuel hose at the joint referred to and will, in fact, by a cutting or wearing action, assist in the destruction thereof.

Any suitable means may be employed for maintaining the protecting sleeve 33 against any material axial displacement toward the free end of the coupling tube 30. For instance, the member 27 may be provided with one or more annular grooves 35 into one of which a resilient split ring 36 may be sprung after the sleeve 33 has been slipped into operative position, the ring 36 forming an annular projection over which said sleeve cannot pass, it being understood that other means or devices whereby equivalent results are obtained, may be substituted.

In some constructions the coupling tube may be connected directly with the fuel hose 25 as indicated in Fig. 6; with this arrangement the fuel tube 30$^a$ which corresponds to the tube 30, may, for instance, be provided with a pair of annular grooves spaced from each other in an axial direction and accommodating respectively split rings 36$^a$ and 36$^b$. With the parts in their assembled condition these rings 36$^a$ and 36$^b$ are located respectively outside and inside of and in close proximity to the preferably reduced end of the protecting sleeve 33 and thus maintain the latter against any material displacement in an axial direction. It will be understood that the ring 36$^b$ with its groove may be replaced by other means whereby an equivalent result is obtained, without in any way affecting the efficiency of this form of my improvement.

With both arrangements described, the sleeve 33 is rotatable relatively to the hose and its connected elements so that twisting or torsional strains on said hose and more particularly on the joint hereinbefore referred to are eliminated. This is also true when the hose is operatively connected with the fixture, the coupling tube 30 or 30$^a$ being freely rotatable therein, thus also protecting the hose against any twisting strains relatively to the fixture.

My invention may be efficiently combined with many devices in which gas or the like is the fuel and is particularly adapted for operative combination with gas ranges; when so used the fitting 10 may be screwed upon the end of the manifold or rail $a$ of the range, as indicated in Fig. 2.

In some constructions of ranges in which said manifold $a$ is not provided with cock for controlling the gas, this control being otherwise secured, it is desirable to use the reducer 37 shown in Fig. 7; this reducer 37 is screwed upon the aforesaid end of the manifold $a$ and is formed with a screw-threaded aperture adapted to receive the reduced end 10$^a$ of the fitting 10$^b$. The latter is constructed with an externally screw-threaded neck 11$^a$ corresponding to the neck 11 and being likewise arranged to detachably receive the sleeve 16. Otherwise the construction and arrangement shown in Fig. 7 may be the same as that illustrated in Fig. 1.

In the form shown in Fig. 8 the tubular member or fitting 10$^b$ which is also arranged for detachable connection with the manifold $a$, is provided with a cock or valve 10$^c$ whereby communication between the manifold $a$ or equivalent element and the sleeve 16 may be controlled; otherwise this form of my invention may also be the same as that shown in Fig. 1.

The fittings 10, 10ᵃ and 10ᵇ, as before stated, may be internally screw-threaded for connection also with a gas lamp, gas iron, or any other apparatus or device in which the construction may be efficiently utilized.

With my improvements, the disadvantages and objections heretofore found in existing constructions are entirely done away with and replaced by structures having a maximum of efficiency and a maximum period of usefulness. The danger of accidental or unintentional disconnection of the fuel hose from the fixture, with its ofttimes disastrous results, is also completely overcome in my invention.

It will be obvious that various changes in the specific constructions and arrangements shown and described may be made within the scope of the claims without departing from the spirit of my invention.

I claim:—

1. The combination of a gas fixture having an interior surface converging toward one end thereof, a tubular member movable in said fixture and provided with radial apertures, balls in said apertures arranged to be forced radially inward by said converging surface, a fuel hose, a coupling tube extending through said tubular member and held by said balls against removal therefrom and a packing sleeve in said fixture arranged to receive and frictionally engage the end of said coupling tube whereby the connection between the latter and said fixture is sealed.

2. The combination of a gas fixture comprising a tubular member, a continuing neck having an internal recess, a tubular packing fixed in said recess, a sleeve detachably connected with said neck and having an interior surface converging toward its outer end, a tubular member slidable in said sleeve in axial registry with said packing and extending exteriorly of said sleeve, said member having radial apertures, balls in said apertures arranged to be forced radially inward by said converging surface, a fuel hose, and a coupling tube carried by said hose and extending through said tubular member into said tubular packing so as to be frictionally engaged thereby, said coupling tube being gripped by said balls.

3. The combination of a tubular unit, a valve located between the opposite ends thereof, said tubular unit having an internal recess, a packing sleeve fixed in said recess, a fuel hose, a coupling tube carried by said fuel hose and arranged to be inserted into said tubular unit and into said packing sleeve so as to be frictionally engaged thereby and means in said unit for resisting a withdrawal of said coupling tube therefrom.

4. The combination of a tubular member, a manually operated valve located between its opposite ends, a continuing neck extending from one end of said member and having an internal recess, a tubular packing fixed in said recess, a sleeve detachably connected with said neck and having an interior surface converging toward its outer end, a tubular member slidable in said sleeve in axial registry with said packing and extending exteriorly of said sleeve, said tubular member having radial apertures, balls in said apertures arranged to be forced radially inward by said converging surface, a fuel hose and a coupling tube carried by said hose and extending through said tubular member into said tubular packing so as to be frictionally engaged thereby, said coupling tube being gripped by said balls.

5. The combination of a fuel hose, a coupling tube having a screw-threaded end and a member connected with said hose and internally screw-threaded for connection with said tube, said member extending beyond the screw-threads of said tube in an axial direction and surrounding the same whereby the tube is protected against breakage at its point of connection with said member.

6. The combination of a fuel hose, a coupling tube having a screw-threaded end, a tubular member carried by said hose and having a recessed, internally screw-threaded end adapted to receive the screw-threaded end of said tube, and a tubular continuation of said end extending beyond the screw-threads in an axial direction and inclosing said tube beyond its screw-threads whereby the latter is protected against breakage at its point of connection with said member.

7. The combination of a fuel hose, a coupling tube connected therewith and a protecting sleeve loosely mounted on the hose and tube and inclosing the joint between said hose and tube and extending beyond the same in opposite directions, said sleeve being held against material movement in axial directions.

8. The combination of a coupling tube, a tubular stem in axial alinement therewith, a fuel hose having its one end slipped over and secured to said stem, a loosely mounted protecting sleeve extending over and completely inclosing said end of the hose and extending lengthwise of the latter, and means whereby said sleeve is held against material movement in axial directions.

9. The combination of a coupling tube, a tubular stem in axial alinement therewith, an annular flange located between the ends of said tube and said stem, a fuel hose having its one end slipped over said stem into engagement with said flange, a loosely mounted protecting sleeve extending over and inclosing said flange and beyond the end of said hose and means for maintaining said sleeve against removal in an axial direction toward the free end of said tube.

10. The combination of a tubular stem, an annular flange thereon, a continuing member having an annular groove, a coupling tube detachably connected with said continuing member, a fuel hose having its one end slipped over said stem into engagement with said flange, a protecting sleeve slipped over said continuing member into engagement with said flange and extending beyond the end of said hose and lengthwise thereof and a split ring sprung into said annular groove to prevent a removal of said sleeve in a direction toward the free end of said tube.

11. The combination of a gas fixture, a packing fixed therein, a fuel hose, a coupling tube connected with said hose and arranged to be detachably connected with said fixture and to engage said packing to produce a gas-tight connection, a loosely mounted protecting sleeve inclosing the joint between said tube and said hose and extending lengthwise of the latter to form a manipulating device adapted to be grasped by the user and means in said fixture for resisting a disconnection of said tube therefrom.

12. The combination of a fuel hose, a coupling tube connected therewith, a loosely mounted protecting sleeve extending over contiguous portions of said fuel hose and coupling tube and means on said coupling tube whereby said protecting sleeve is maintained in operative position.

13. The combination of a fuel hose, a coupling tube connected therewith and provided with an annular groove, a protecting sleeve extending over contiguous portions of said fuel hose and coupling tube, means on said coupling tube for preventing any material axial movement of said sleeve in one direction, and a split ring in said groove for preventing any material axial movement of said sleeve in the opposite direction.

14. The combination of a fuel hose, a coupling tube connected therewith and provided with a pair of annular grooves, a protecting sleeve extending over contiguous portions of said fuel hose and coupling tube and having its one end located between said grooves, and split rings located in said grooves outside of and within said one end and coöperating therewith to maintain said protecting tube against any material movement in an axial direction.

In testimony whereof I have hereunto set my hand.

CHARLES STICHLER.